(12) United States Patent
Song et al.

(10) Patent No.: US 12,330,609 B2
(45) Date of Patent: Jun. 17, 2025

(54) APPARATUS, METHOD AND COMPUTER READABLE STORAGE MEDIUM FOR CLEANING OF BRAKE DISC

(71) Applicants: HYUNDAI MOTOR COMPANY, Seoul (KR); KIA CORPORATION, Seoul (KR)

(72) Inventors: Sung Keun Song, Suwon-si (KR); Sung Min Park, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 273 days.

(21) Appl. No.: 18/124,710

(22) Filed: Mar. 22, 2023

(65) Prior Publication Data
US 2024/0190409 A1  Jun. 13, 2024

(30) Foreign Application Priority Data

Dec. 7, 2022 (KR) .......................... 10-2022-0169482

(51) Int. Cl.
| | |
|---|---|
| *B60T 17/22* | (2006.01) |
| *B60K 35/00* | (2006.01) |
| *B60T 8/17* | (2006.01) |
| *F16D 65/00* | (2006.01) |
| *B60K 35/28* | (2024.01) |
| *B60L 7/26* | (2006.01) |
| *B60T 13/12* | (2006.01) |

(52) U.S. Cl.
CPC ............ *B60T 17/221* (2013.01); *B60K 35/00* (2013.01); *B60T 8/17* (2013.01); *F16D 65/0037* (2013.01); *B60K 35/28* (2024.01); *B60K 2360/172* (2024.01); *B60L 7/26* (2013.01); *B60T 13/12* (2013.01); *B60T 2270/604* (2013.01)

(58) Field of Classification Search
CPC .......... B60T 17/221; B60T 8/17; B60T 13/12; B60T 2270/604; B60K 35/00; B60K 35/28; B60K 2360/172; F16D 65/0037; F16D 65/12; B60L 7/26; B60Y 2400/81
USPC ...................................................... 701/70, 76
See application file for complete search history.

(56) References Cited

U.S. PATENT DOCUMENTS

| | | | |
|---|---|---|---|
| 2013/0023382 A1 | 1/2013 | Ljungdahl | |
| 2020/0156614 A1 | 5/2020 | Choi et al. | |

FOREIGN PATENT DOCUMENTS

| | | | | |
|---|---|---|---|---|
| DE | 102022209389 | * | 3/2024 | .............. B60T 17/22 |
| JP | 2006-123619 A | | 5/2006 | |
| JP | 2008-101654 A | | 5/2008 | |

(Continued)

*Primary Examiner* — Hai H Huynh
(74) *Attorney, Agent, or Firm* — Morgan, Lewis & Bockius LLP

(57) ABSTRACT

An apparatus for cleaning of a brake disc may include: a processor; and a storage medium in which one or more programs configured to be executable by the processor are recorded, and the one or more programs includes instructions for: a determination unit configured to determine whether a mode change has occurred from a first mode of transporting a shipped vehicle to a second mode of delivering the vehicle to a customer; and a braking controller configured to remove rust generated on a surface of a brake disc by performing braking according to a cleaning mode of the brake disc when it is determined that the mode change has occurred.

20 Claims, 4 Drawing Sheets

(56) References Cited

FOREIGN PATENT DOCUMENTS

| JP | 5085108 B2 | 11/2012 |
|---|---|---|
| KR | 10-1263157 B1 | 5/2013 |
| KR | 10-2020-0058839 A | 5/2020 |

\* cited by examiner

APPARATUS, METHOD AND COMPUTER READABLE STORAGE MEDIUM FOR CLEANING OF BRAKE DISC

CROSS-REFERENCE TO RELATED APPLICATION(S)

This application claims benefit of priority to Korean Patent Application No. 10-2022-0169482 filed on Dec. 7, 2022 in the Korean Intellectual Property Office, the disclosure of which is incorporated herein by reference in its entirety.

TECHNICAL FIELD

The present disclosure relates to an apparatus, method and computer readable storage medium for cleaning of a brake disc.

BACKGROUND

Rust may occur on a surface of a brake disc when a vehicle is left unattended for a long period of time or in the event of rain while producing the vehicle and delivering it to a customer. Specifically, eco-friendly vehicles such as electric vehicles and hybrid vehicles may be particularly vulnerable to the occurrence of rust because regenerative braking using a motor is simultaneously performed.

In order to remove such rust, some automakers offer a brake disc cleaning (BDC) function. Such a brake disc cleaning function refers to the removal of rust generated on a surface of a brake disc by pressing a pad to the brake disc with hydraulic pressure during driving of the vehicle.

However, a method for setting the brake disc cleaning function may vary for each vehicle type. In other words, in some models, an auto hold button has to be pressed for a few seconds, and in other models, they have to be set separately in relation to regenerative braking. Therefore, customers may have difficulty directly operating the brake disc cleaning function.

SUMMARY

An aspect of the present disclosure is to provide an apparatus, method and computer readable storage medium for cleaning of a brake disc, which can remove rust caused by long-term disuse of a shipped vehicle or rainy weather to improve noise vibration and harshness (NVH) performance when braking the shipped vehicle, and can prevent unnecessary claims.

According to an aspect of the present disclosure, the apparatus for cleaning of a brake disc may include: a processor; and a storage medium in which one or more programs configured to be executable by the processor are recorded, and the one or more programs may include instructions for: a determination unit configured to determine whether a mode change has occurred from a first mode of transporting a shipped vehicle to a second mode of delivering the vehicle to a customer; and a braking controller configured to remove rust generated on a surface of a brake disc by performing braking according to a cleaning mode of the brake disc when it is determined that the mode change has occurred.

According to another aspect of the present disclosure, a method for cleaning of a brake disc may include: a first operation of determining whether a mode change has occurred from a first mode of transporting a shipped vehicle to a second mode of delivering the vehicle to a customer; and a second operation of removing rust generated on a surface of a brake disc by performing braking according to a cleaning mode of the brake disc when it is determined that the mode change has occurred.

According to still another aspect of the present disclosure, a computer-readable storage medium recording a program for executing the method on a computer is provided.

An aspect of the present disclosure may automatically activate a brake disc cleaning function at the time of delivery of a vehicle, which can remove rust caused by the long-term disuse of a shipped vehicle or rainy weather to improve noise vibration and harshness (NVH) performance when braking the shipped vehicle, and can prevent unnecessary claims.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1A:
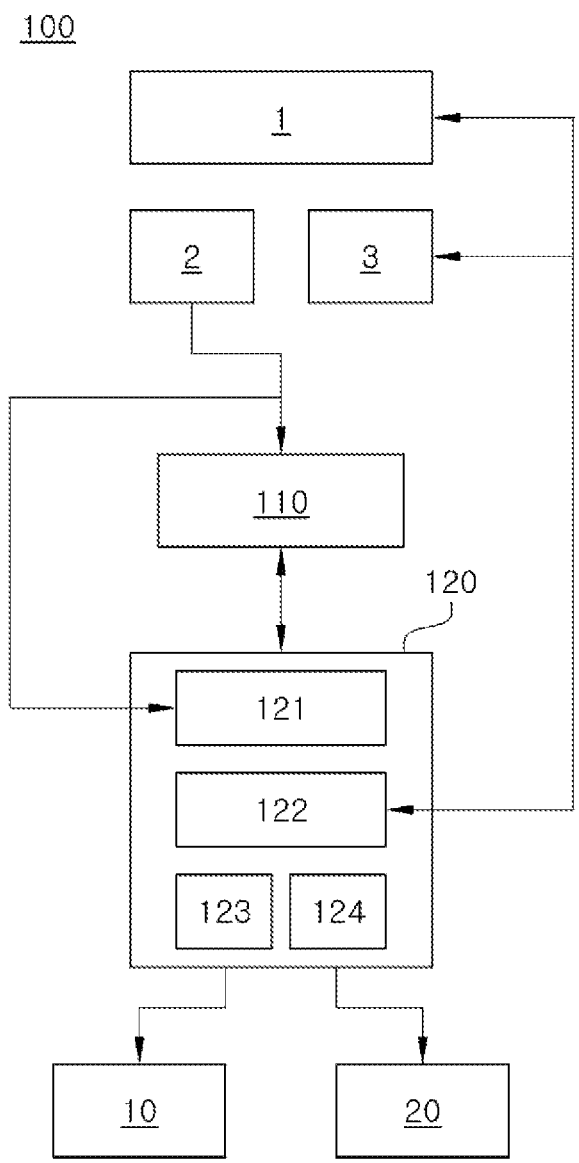
FIG. 1A is a block diagram of an entire system including an apparatus for cleaning a brake disc according to an example embodiment of the present disclosure.

Hereinafter, embodiments of the present disclosure will be described with reference to the attached drawings. The disclosure may, however, be exemplified in many different forms and should not be construed as being limited to the specific embodiments set forth herein. In the drawings, the shapes and dimensions of elements may be exaggerated for clarity, and the same reference numerals will be used throughout to designate the same or like elements.

FIG. 1A is a block diagram of an entire system 100 including an apparatus 120 for cleaning a brake disc according to an example embodiment of the present disclosure As illustrated in FIG. 1A, the entire system 100 may include a display unit 1, a mode change button 2, a cleaning mode stop button 3, a dark current controller 110, the apparatus 120 for cleaning a brake disc, a brake disc module 10, and a driving motor 20.

According to an exemplary embodiment of the present disclosure, the dark current controller 110 may include a processor (e.g., computer, microprocessor, CPU, ASIC, circuitry, logic circuits, and etc.) an associated non-transitory memory storing software instructions which, when executed by the processor, provides the functionalities of the dark current controller 110 as described here. Herein, the memory and the processor may be implemented as separate semiconductor circuits. Alternatively, the memory and the processor may be implemented as a single integrated semiconductor circuit. The processor may embody one or more processor(s).

First of all, the dark current controller 110 may prevent a battery from discharging by blocking a dark current by a load device by cutting off a power supply path between the battery and the load device while a shipped vehicle is transported (referred to as a 'power cut').

In addition, the dark current controller 110 may connect the power supply path between the battery and the load device after delivering the vehicle to a customer, thus normally supplying the battery to the load device (referred to as 'power cut release').

The aforementioned load device may be an electronic device such as a body control module (BCM) or an integrated electric brake (IEB), which uses battery power.

When the power cut operates, each vehicle communication signal for the power cut may be transmitted to the load device through a vehicle communication network, and when the power cut is released, a vehicle communication signal for releasing the power cut may be transmitted to the load device through the vehicle communication network.

The dark current controller 110 may also be referred to as an integrated central gateway unit (ICU).

In addition, the dark current controller 110 and the apparatus 120 for cleaning a brake disc described below may be interconnected through the vehicle communication network. The above-described vehicle communication network may include, for example, a controller area network (CAN), a local interconnect network (LIN), FlexRay, and a media oriented system transport (MOST).

Meanwhile, the apparatus 120 for cleaning a brake disc may remove rust generated on a surface of the brake disc by performing braking according to a cleaning mode of the brake disc through the brake disc module 10.

The apparatus 120 for cleaning a brake disc may include a determination unit 121, a braking controller 122, a first storage unit 123, and a second storage unit 124.

Specifically, the determination unit 121 may determine whether a mode change has occurred from a first mode of transporting the shipped vehicle to a second mode of delivering the vehicle to the customer.

According to an exemplary embodiment of the present disclosure, the determination unit 121 may include a processor (e.g., computer, microprocessor, CPU, ASIC, circuitry, logic circuits, etc.) and an associated non-transitory memory storing software instructions which, when executed by the processor, provides the functionalities of the determination unit 121 as described here. Herein, the memory and the processor may be implemented as separate semiconductor circuits. Alternatively, the memory and the processor may be implemented as a single integrated semiconductor circuit. The processor may embody one or more processor(s).

According to an exemplary embodiment of the present disclosure, the braking controller 122 may include a processor (e.g., computer, microprocessor, CPU, ASIC, circuitry, logic circuits, etc.) and an associated non-transitory memory storing software instructions which, when executed by the processor, provides the functionalities of the braking controller 122 as described here. Herein, the memory and the processor may be implemented as separate semiconductor circuits. Alternatively, the memory and the processor may be implemented as a single integrated semiconductor circuit. The processor may embody one or more processor(s).

Here, the first mode refers to a mode set when transporting the shipped vehicle, and may also be referred to as a 'vehicle transport mode.'

Figure 1B:
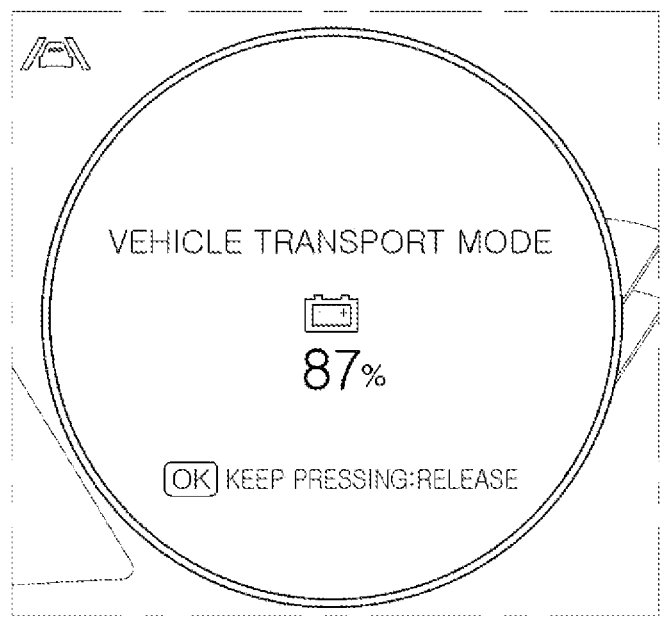
FIG. 1B illustrates a screen displayed in a first mode according to an example embodiment of the present disclosure.

FIG. 1B illustrates a screen displayed in the first mode according to an example embodiment of the present disclosure.

As illustrated in FIG. 1B, when transporting the shipped vehicle, a notification indicating that the vehicle is in a vehicle transport mode may be displayed on the display unit 1. In addition, in order to release the vehicle transport mode, it may be displayed that the vehicle transport mode can be released by maintaining pressure on an "OK" button for a prolonged period. Here, it should be noted that the "OK" button corresponds to the mode change button 2 illustrated in FIG. 1A, and may be, for example, a button provided on a crossbar of a handle, but the present disclosure is not necessarily limited thereto.

The "OK" button may be pressed by an employee at a dispatch center or a dealer when the vehicle is delivered to the customer in the future, thus releasing the vehicle transport mode.

In the first mode, the power supply path between the battery and the load device may be cut off under the control of the dark current controller 110.

In addition, the second mode refers to a mode set when the vehicle is delivered to the customer, and may also be referred to as a 'customer mode.' In the second mode, the power supply path between the battery and the load device may be connected under the control of the aforementioned dark current controller 110.

That is, while the shipped vehicle is transported, in the first mode, the dark current controller 110 may cut off the power supply path between the battery and the load device to block the dark current by the load device. In addition, after the vehicle is delivered to the customer, in the second mode, the dark current controller 110 may connect the power supply path between the battery and the load device so that the battery may be normally supplied to the load device.

Meanwhile, according to an example embodiment of the present disclosure, when detecting the vehicle communication signal for releasing the power cut, the determination unit 121 may determine that the mode change has occurred.

Here, the vehicle communication signal for releasing the power cut may be a signal transmitted from the dark current controller 110 for controlling connection or disconnection of the power supply path between the battery and the load device to the load device.

In addition, according to an example embodiment of the present disclosure, when detecting an operation signal of the mode change button 2, the determination unit 121 may determine that the mode change has occurred.

When determining that the mode change has occurred from the first mode to the second mode, the braking controller 122 may remove the rust generated on the surface of the brake disc by performing braking according to the cleaning mode of the brake disc. While performing the braking according to the cleaning mode of the brake disc, regenerative braking by the driving motor may be interrupted.

Here, the cleaning mode of the brake disc is a mode of performing braking by hydraulic pressure, and regenerative braking by the driving motor 20 may be interrupted during the performance of the braking according to the cleaning mode.

Specifically, the braking controller 122 may accumulate braking energy and a driving distance of a vehicle during a braking operation of the vehicle, and may interrupt the braking according to the cleaning mode of the brake disc when at least one of the accumulated braking energy and the accumulated driving distance exceeds preset values for each of the braking energy and the driving distance. It should be noted that the preset values may be set based on experimental data or according to the needs of those skilled in the art, and specific values are not limited thereto.

Here, the braking energy may be obtained according to Equation 1 below.

$$W = \frac{P \times TF}{R} \times L \qquad \text{<Equation 1>}$$

Here, W may refer to braking energy (kJ), P may refer to braking hydraulic pressure (bar), TP may refer to a torque factor (Nm/bar), R may refer to a dynamic radius of a tire (m), and L may refer to a moving distance (km) during braking.

Alternatively, the braking energy may be simply obtained according to Equation 2 below.

$$W = \frac{1}{2} \times M \times (V2 - V1)^2 \qquad \text{<Equation 2>}$$

Here, W may refer to braking energy (kJ), M may refer to a weight (kg) of the vehicle, V2 may refer to the driving speed of the vehicle at the end of the braking, and V1 may refer to the driving speed of the vehicle at the start of the braking.

In addition, according to an example embodiment of the present disclosure, when detecting the operation signal of the cleaning mode stop button, the braking controller 122 may interrupt the braking according to the cleaning mode of the brake disc. It should be noted that the cleaning mode stop button corresponds to the button 2 illustrated in FIG. 1A, and may be, for example, an auto-hold button, but the present disclosure is not necessarily limited thereto.

Meanwhile, according to an example embodiment of the present disclosure, the accumulated braking energy and the accumulated driving distance may be stored in the first storage unit 123. Here, the first storage unit 123 may be a non-volatile memory (e.g., an EEPROM).

Since the accumulated braking energy and the accumulated driving distance are stored in the non-volatile memory, the stored braking energy and driving distance may be continuously accumulated even if an ignition is repeatedly turned on (IGN ON) or off (IGN OFF) in the future, thus determining the time of interrupting the braking according to the cleaning mode of the brake disc.

The braking controller 122 may also be referred to as an integrated electric brake (IEB) controller.

Meanwhile, the second storage unit 124 may store a program for executing the method for cleaning a brake disc in a computer.

The display unit 1 may be, for example, a cluster mounted in the vehicle.

As described above, according to an example embodiment of the present disclosure, the display unit 1 may display a notification indicating that the vehicle is in the vehicle transport mode when transporting the shipped vehicle.

Alternatively, according to an example embodiment of the present disclosure, the display unit 1 may display a notification of performing the braking according to the cleaning mode of the brake disc or a notification of interrupting the braking according to the cleaning mode of the brake disc.

Meanwhile, as described above, the mode change button 2 may be the button provided on the crossbar of the handle, and may be the button for releasing the vehicle transport mode.

In addition, the cleaning mode stop button 3 may be, for example, an auto hold button, and when pressing the cleaning mode stop button 3, the braking according to the cleaning mode may be interrupted.

The brake disc module 10 may be a module for performing braking on the brake disc. The brake disc module 10 may remove the rust generated on the surface of the brake disc by pressing the pad to the brake disc by hydraulic pressure according to the cleaning mode of the brake disc under the control of the brake controller 122. The brake disc module 10 may have known constituents such as a brake disc, a caliper, and a pad.

The driving motor 20 is a motor that drives the vehicle, and may include, for example, an induction motor, a synchronous motor, and the like. The driving motor 20 may perform regenerative braking under the control of the braking controller 122.

As described above, according to an example embodiment of the present disclosure, the brake disc cleaning function may be automatically activated at the time of delivery of the vehicle, thereby removing the rust caused by the long-term neglect of the shipped vehicle or the rainy weather. Accordingly, it is possible to improve noise vibration and harshness (NVH) performance when performing braking on the shipped vehicle, and to prevent unnecessary claims.

Figure 2:
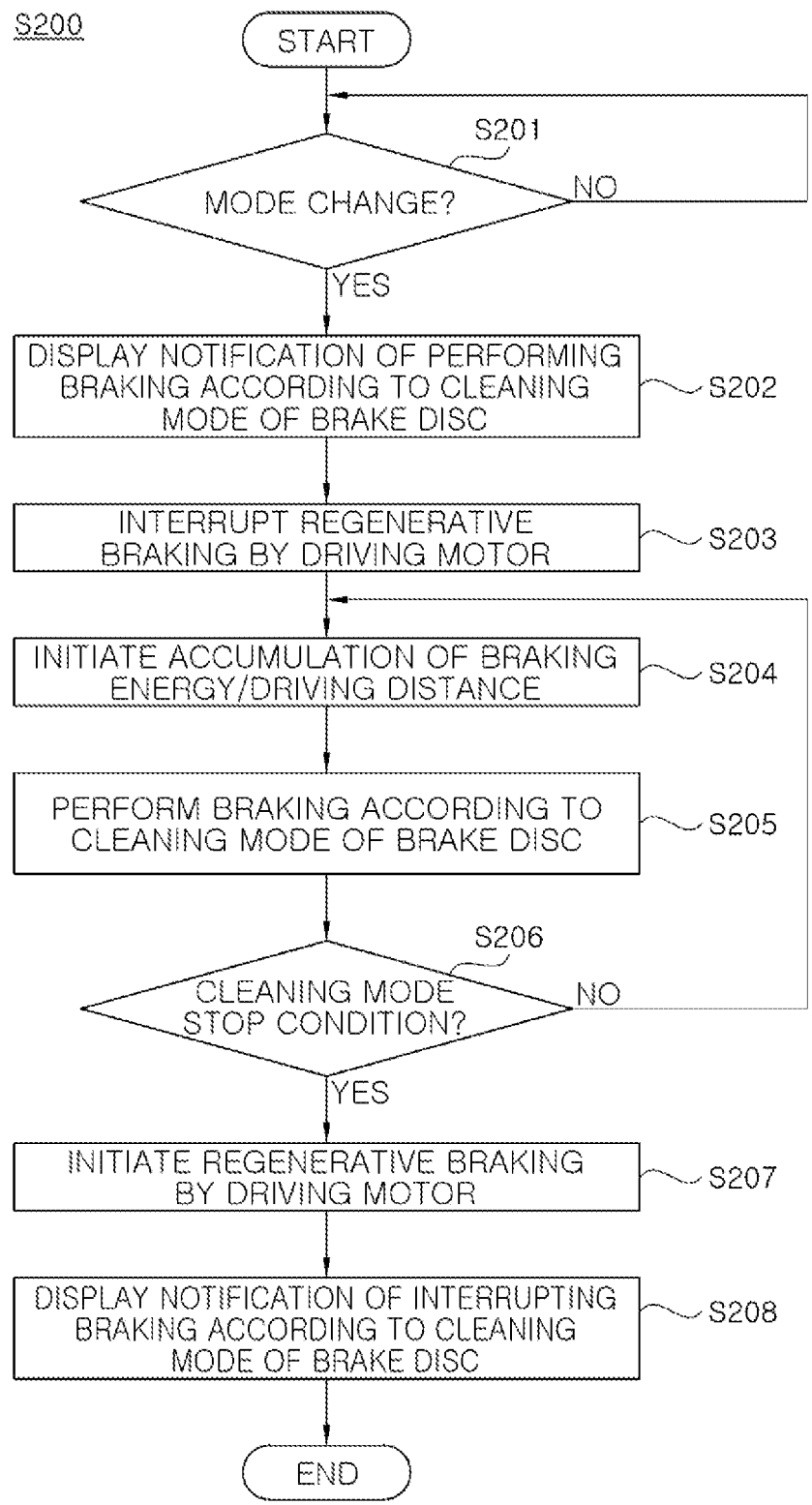
FIG. 2 is a flowchart illustrating a method of cleaning a brake disc according to an example embodiment of the present disclosure.

FIG. 2 is a flowchart illustrating the method for cleaning a brake disc according to an example embodiment of the present disclosure.

Hereinafter, a method for cleaning a brake disc (S200) according to an example embodiment of the present disclosure will be described with reference to FIGS. 1A to 2. However, for simplification of the present disclosure, redundant descriptions of FIGS. 1A and 1B will be omitted.

Referring to FIGS. 1A to 2, the method for cleaning the brake disc (S300) according to an example embodiment of the present disclosure may be started by determining whether the mode change has occurred from the first mode of transporting the shipped vehicle to the second mode of delivering the vehicle to the customer in the determination unit 121 (S201).

Here, as described above, the first mode may refer to a state in which the power supply path between the battery and the load device is disconnected, and the second mode may refer to a state in which the power supply path between the battery and the load device is connected.

According to an example embodiment of the present disclosure, when detecting the vehicle communication signal for releasing the power cut, the determination unit 121 may determine that the mode change has occurred.

Here, as described above, the vehicle communication signal for releasing the power cut may be the signal transmitted from the dark current controller 110 for controlling connection or disconnection of the power supply path between the battery and the load device to the load device.

In addition, as described above, according to an example embodiment of the present disclosure, when detecting the operation signal of the mode change button 2, the determination unit 121 may determine that the mode change has occurred.

Then, when determining that the mode change has occurred as results of the determination in operation S201, the display unit 1 may display a notification indicating performance of the braking according to the cleaning mode of the brake disc (S202).

Then, the braking controller 122 may interrupt regenerative braking by the driving motor 20 (S203).

Then, the braking controller 122 may initiate the accumulation of the braking energy and the driving distance of the vehicle during the braking operation of the vehicle (S204).

As described above, according to an example embodiment of the present disclosure, since the accumulated braking energy and the accumulated driving distance are stored in the non-volatile memory, the stored braking energy and driving distance may be continuously accumulated even if an ignition is repeatedly turned on (IGN ON) or off (IGN OFF) in the future, thus determining the time of interrupting the braking according to the cleaning mode of the brake disc.

Then, the braking controller 122 may remove the rust generated on the surface of the brake disc by performing braking according to the cleaning mode of the brake disc (S205).

Meanwhile, in operation S206, the determination unit 121 may determine whether an interruption condition of the cleaning mode is satisfied (S206). As a result of the determination, when an interruption condition of the cleaning mode is satisfied, the process may proceed to operation S207, or otherwise, the process may proceed to operation S204.

Here, the interruption condition of the cleaning mode may denote at least one of when the accumulated braking energy exceeds the preset value, when the accumulated driving distance exceeds the preset value, or when the operation signal of the shutdown button of the cleaning mode is detected.

In other words, when the accumulated braking energy exceeds the preset value, when the accumulated driving distance exceeds the preset value, or when the operation signal of the cleaning mode stop button is detected, the braking controller 122 may interrupt the braking according to the cleaning mode and initiate the regenerative braking by the driving motor (S207).

Finally, the display unit 1 may display a notification of interrupting the braking according to the cleaning mode of the brake disc (S208).

As described above, according to an example embodiment of the present disclosure, the brake disc cleaning function is automatically activated at the time of delivery of the vehicle, thereby removing the rust caused by the long-term neglect or the rain weather of the shipped vehicle. Accordingly, it is possible to improve the noise vibration and harshness (NVH) performance when performing braking on the shipped vehicle, and to prevent unnecessary claims. The brake disc cleaning function may be automatically operated only once after the vehicle is shipped.

Figure 3:
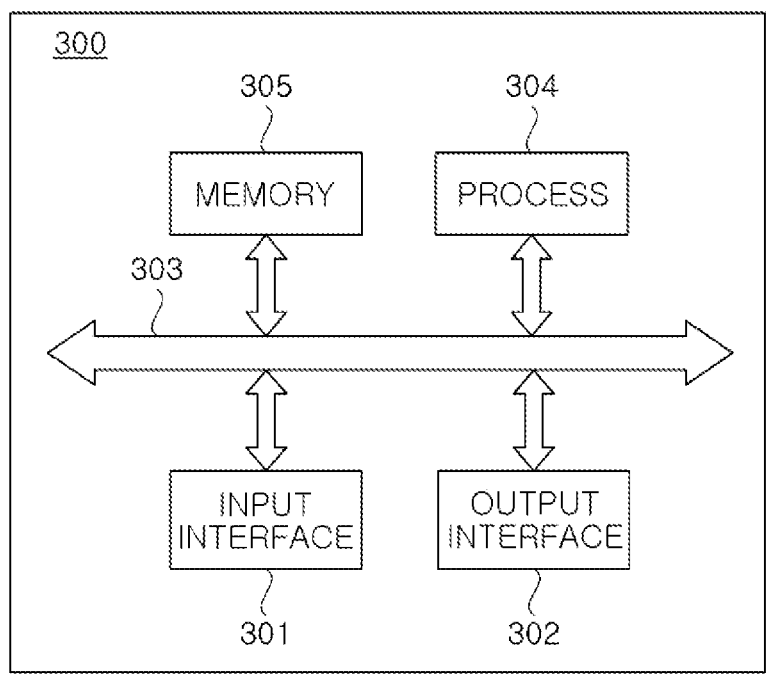
FIG. 3 is a block diagram of a computer device which may entirely or partially implement the apparatus for cleaning a brake disc according to an example embodiment of the present disclosure.

Meanwhile, FIG. 3 is a block diagram of a computer device which may entirely or partially implement the apparatus for cleaning a brake disc according to an example embodiment of the present disclosure, and may be applied to the apparatus 120 for cleaning a brake disc illustrated in FIG. 1.

As illustrated in FIG. 3, a computer device 300 may include an input interface 301, an output interface 302, a processor 304, and a memory 305, and the input interface 301, the output interface 302, the processor 304, and the memory 305 may be interconnected through a system bus 303.

In an example embodiment of the present disclosure, the memory 305 is used to store a program, instructions, or a code, and the processor 304 may execute the program, instructions, or the code stored in the memory 305, control the input interface 301 to receive a signal, and control the output interface 302 to transmit the signal. The memory 305 may include a read-only memory and a random access memory, and may provide the instructions and data to the processor 304.

In an example embodiment of the present disclosure, the processor 304 may be a central processing unit (CPU), or the processor 304 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like. The processor 304 described above may perform an operation of an apparatus 120 for cleaning a brake disc described above.

In one implementation process, the method of FIG. 2 may be achieved by an integrated logic circuit in the processor 304 or instructions in the form of software. The content of the method disclosed in conjunction with the embodiments of the present disclosure may be directly embodied and executed by a hardware processor, or may be executed and completed by a combination of hardware and software modules in the processor. The software module may be disposed in a storage medium such as a random access memory, a flash memory, a read-only memory, a programmable read-only memory, or an electrically erasable programmable memory, and registers. The storage medium is located in the memory 305, and the processor 304 reads information from the memory 305 and performs operations of the above method in combination with its hardware. In order to avoid repetition, they will not be described in detail here.

In addition, in describing the present disclosure, a 'unit' may be implemented in various ways, such as processors, program instructions executed by processors, software modules, microcode, computer program products, logic circuits, application-only integrated circuits, firmware, and the like.

The present invention is not limited to the embodiment described above and the accompanying drawings. The scope of rights of the present invention is intended to be limited by the appended claims. It will be understood by those skilled in the art that various substitutions, modification and changes in form and details may be made therein without departing from the spirit and scope of the present invention as defined by the appended claims.

What is claimed is:

1. An apparatus for cleaning of a brake disc, the apparatus comprising:
   a processor; and
   a storage medium in which one or more programs configured to be executable by the processor are recorded,
   wherein the one or more programs includes instructions for:
   a determination unit configured to determine whether a mode change has occurred from a first mode of transporting a shipped vehicle to a second mode of delivering the vehicle to a customer; and
   a braking controller configured to remove rust generated on a surface of a brake disc by performing braking according to a cleaning mode of the brake disc in response to a determination that the mode change has occurred.

2. An apparatus for cleaning of a brake disc according to claim 1, wherein the first mode refers to a state in which a power supply path between a battery and a load device is disconnected, and the second mode refers to a state in which the power supply path between the battery and the load device is connected.

3. An apparatus for cleaning of a brake disc according to claim 1, wherein the cleaning mode of the brake disc refers to a mode in which braking by hydraulic pressure is performed.

4. An apparatus for cleaning of a brake disc according to claim 1, wherein in response to detecting a vehicle communication signal for releasing a power cut, the determination unit determines that a mode change has occurred, and the vehicle communication signal for releasing the power cut is a signal transmitted from a dark current controller configured to control connection or disconnection of a power supply path between a battery and a load device to the load device.

5. An apparatus for cleaning of a brake disc according to claim 1, wherein in response to detecting an operation signal of a mode change button, the determination unit determines that the mode change has occurred.

6. An apparatus for cleaning of a brake disc according to claim 1, wherein the braking controller accumulates braking energy and a driving distance of a vehicle during a braking operation of the vehicle, and when at least one of the accumulated braking energy and the accumulated driving distance exceeds preset values for each of the braking energy and the driving distance, braking according to the cleaning mode of the brake disc is interrupted.

7. An apparatus for cleaning of a brake disc according to claim 6, wherein the accumulated braking energy and the accumulated driving distance are stored in a non-volatile memory.

8. An apparatus for cleaning of a brake disc according to claim 6, wherein in response to detecting an operation signal of the cleaning mode stop button, the braking controller interrupts the braking according to the cleaning mode of the brake disc.

9. An apparatus for cleaning of a brake disc according to claim 1, wherein the braking controller interrupts regenerative braking by a driving motor while performing the braking according to the cleaning mode of the brake disc.

10. An apparatus for cleaning of a brake disc according to claim 1, further comprising: a display unit configured to displays a notification of performing the braking according to the cleaning mode of the brake disc or a notification of interrupting the braking according to the cleaning mode of the brake disc.

11. A method for cleaning of a brake disc, the method comprising:

a first operation of determining whether a mode change has occurred from a first mode of transporting a shipped vehicle to a second mode of delivering the vehicle to a customer; and a second operation of removing rust generated on a surface of a brake disc by performing braking according to a cleaning mode of the brake disc in response to a determination that that a mode change has occurred.

12. The method for cleaning of a brake disc of claim 11, wherein the first mode refers to a state in which a power supply path between a battery and a load device is disconnected, and the second mode refers to a state in which the power supply path between the battery and the load device is connected.

13. The method for cleaning of a brake disc of claim 11, wherein the cleaning mode of the brake disc refers to a mode in which braking by hydraulic pressure is performed.

14. The method for cleaning of a brake disc of claim 11, wherein in response to detecting a vehicle communication signal for releasing a power cut, it is determined in the first operation that a mode change has occurred, and the vehicle communication signal for releasing the power cut is a signal transmitted from a dark current controller configured to control connection or disconnection of a power supply path between a battery and a load device to the load device.

15. The method for cleaning of a brake disc of claim 11, wherein in response to detecting an operation signal of a mode change button, it is determined in the first operation that the mode change has occurred.

16. The method for cleaning of a brake disc of claim 11, further comprising: accumulating braking energy and a driving distance of a vehicle during a braking operation of the vehicle; and interrupting the braking according to the cleaning mode of the brake disc when at least one of the accumulated braking energy and the accumulated driving distance exceeds preset values for each of the braking energy and the driving distance.

17. The method for cleaning of a brake disc of claim 16, wherein the accumulated braking energy and the accumulated driving distance are stored in a non-volatile memory.

18. The method for cleaning of a brake disc of claim 16, further comprising: interrupting the braking according to the cleaning mode of the brake disc in response to detecting an operation signal of the cleaning mode stop button.

19. The method for cleaning of a brake disc of claim 11, wherein in the second operation, regenerative braking by a driving motor while performing the braking according to the cleaning mode of the brake disc is interrupted.

20. A computer-readable storage medium recording a program for executing the method according to claim 11 on a computer.

* * * * *